Patented July 28, 1936

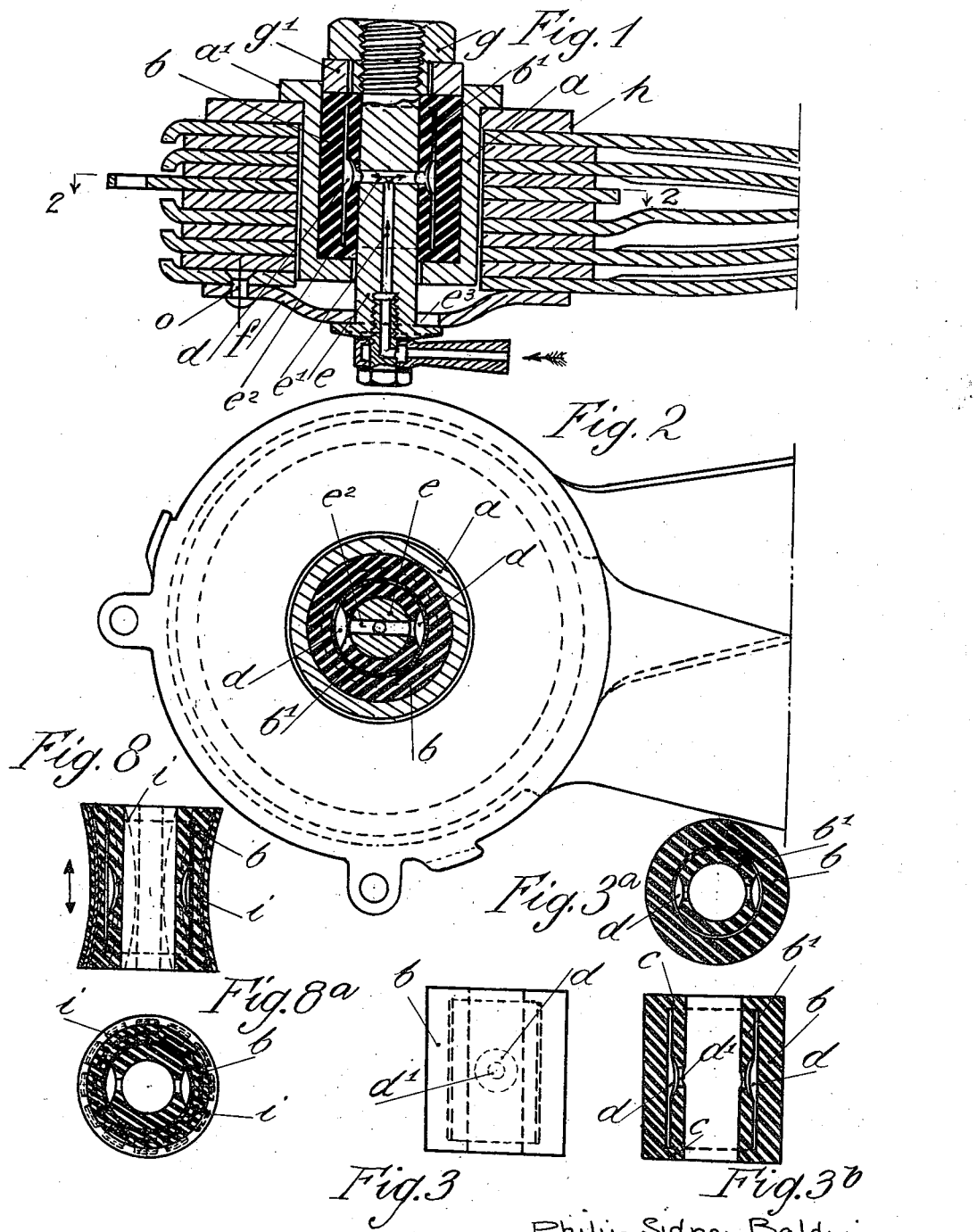

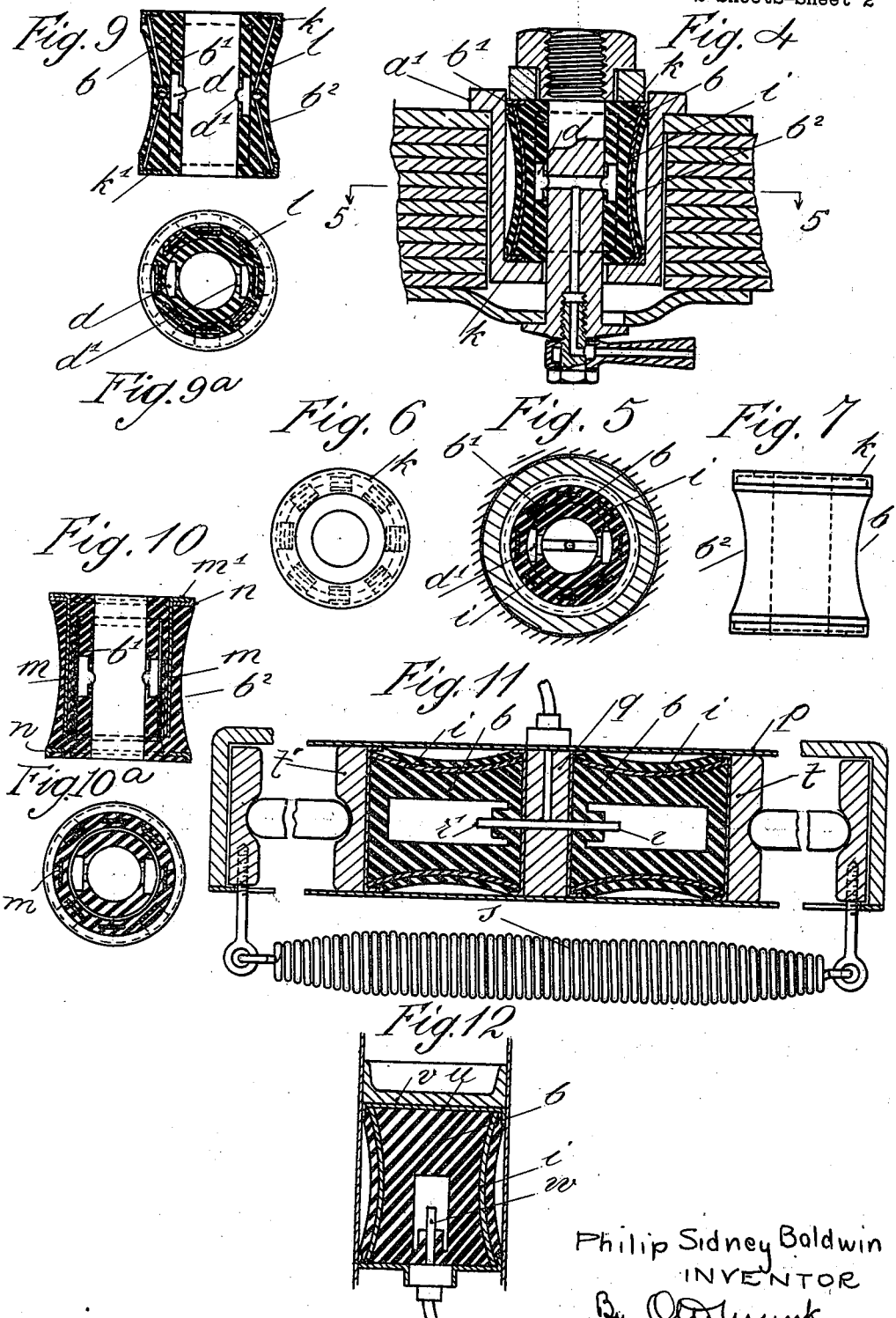

2,048,771

UNITED STATES PATENT OFFICE 2,048,771

HYDRAULIC TRANSMISSION

Philip Sidney Baldwin, Florence, Italy

Application March 23, 1934, Serial No. 717,026
In Italy May 2, 1933

24 Claims. (Cl. 188—130)

The invention relates to an improved system for applying hydraulic pressure to any given transmitting member as for example to press into frictional contact friction surfaces as in mechanical shock absorbers, vehicle brakes or the like; to actuate pressing tools or the like or to compress fluid in a closed circuit which is not in direct circuit with the transmitting hydraulic pressure system.

The object of the invention is to provide an improved hydraulic compression agent in which hydraulic pressure exerted radially on the walls of same when it is inserted in a cylinder, cup or other suitable rigid container, may be converted through said compression agent into longitudinal or axial pressure on a given transmitting surface and which, when suitable mechanical elements are incorporated with it, is capable of amplifying by mechanical means the said longitudinal or axial pressure on the transmitting surface.

A further object is to provide a hydraulic compression agent which is so constituted that it may be subjected to and transmit independently hydraulic or mechanical pressure, each supplementing the other and in inverse order.

The hydraulic compression agent which is the subject of the present invention may be composed of elastic material such as rubber, or of a combination of such elastic material and curved steel leaf springs, articulated levers or the like, incorporated together so as to form a unit and so constituted as to receive and hermetically seal a fluid injected under pressure. As a concrete example for instance, the elastic compression element may take the form of a cylindrical block bored longitudinally and composed of two thick rubber tubes fitting snugly one in the other with the two ends sealed by vulcanization and the inner tube provided with vents or passageways through which fluid may be injected under pressure into the body of the block between the concentric tubes but this is by no means the only form that the compression agent may take for it may vary both as to shape and the disposition of its component parts without departing from the principle of the invention.

It will be evident that if a compression element as described, is fitted into a rigid cylinder or cup—into the central pivot cup of a friction shock absorber, for example—and it is transfixed through its axis by a bolt, through which a liquid may be injected into the element under pressure, said hydraulic pressure will tend to separate the adjacent inner walls of the concentric tubes and will compress radially the elastic walls of these tubes against the bolt and the retaining wall of the cup and thereby tend to elongate the elastic element which may thus convert the radial hydraulic pressure into potential axial pressure. If on the other hand, the elastic rubber block is compressed by mechanical means in the longitudinal or axial sense, it will tend to be depressed in the container cup and the inner adjacent walls of the concentric tubes will tend to be pressed one against the other and the element as a whole compressed radially against the central bolt and the retaining wall of the cup. In other words, hydraulic or mechanical pressure may be applied to the compression element independently, each supplementing the other and in inverse order.

By incorporating in the elastic walls of the compression element suitably disposed curved leaf springs or articulated levers or the like for example, it will be possible to convert the hydraulic pressure which is exerted radially on said walls into axial pressure which may be amplified considerably by reason of these incorporated mechanical parts. Thus, if a number of curved steel leaf springs are incorporated longitudinally in the outer wall of the elastic block with their convex surfaces facing inwards towards the centre and the exterior surface of the block is suitably curved to follow the concave profile of the springs and the composite block thus constituted is fitted into the shock absorber pivot cup as described above, it will be obvious that when the fluid is injected into the body of the block, the radial hydraulic pressure will take effect on the convex surfaces of the springs which will tend to be straightened out and exert a powerful thrust at the two extremities. This mechanical axial thrust by the springs under hydraulic compression will be added to the regular potential hydraulic axial pressure and will amplify it considerably. If this composite compression element is subjected to mechanical pressure in the axial sense, it will be depressed in the cup and its component parts will be compressed in inverse order to the hydraulic compression exactly as in the case of the all-rubber elastic element.

I am aware that elastic material such as rubber or the like, has been utilized to form an expansible bag, envelope or chamber through the elastic walls of which hydraulic pressure is transmitted directly to the friction transmitting parts to press them into frictional contact. It is a definite characteristic of the present invention that hydraulic pressure is transmitted to the given transmitting surface indirectly through the walls of the compression element and not merely directly through these walls as if it were used as an elastic hydraulic expander pure and simple. It is in fact, this characteristic which makes it possible for the element to receive and transmit independently hydraulic or mechanical pressure.

Having given a general concept of the nature of the invention, it is now proposed to describe and illustrate the device under consideration as applied to the friction pack of a mechanical shock absorber, to the wheel cylinder of a vehicle hydraulic brake and to a fluid compression cylinder respectively, but these are by no means the only applications possible.

Fig. 1 is a sectional view of the friction shock absorber working parts.

Fig. 2 is a vertical sectional view on line 2—2 of Figure 1.

Fig. 3 represents an external view of the all rubber compression element.

Figure 3a is a central transverse sectional view of Figure 3.

Figure 3b is a central vertical sectional view of Figure 3.

Figure 4 is a horizontal sectional view similar to Figure 1, of a modified form of rubber compression element.

Figure 5 is a sectional view on line 5—5 of Figure 4.

Fig. 6 is an end elevation of the elastic element shown in Fig. 4.

Fig. 7 is a side view of the elastic element shown in Fig. 4.

Figure 8 is a sectional view of the elastic element shown in Figure 4, without flanged end washers. Figure 8a is a central transverse section of the element shown in Figure 8.

Figure 9 is a sectional view of a further modified form of the elastic element shown in Figure 4. Figure 9a is a central transverse section of the element shown in Figure 9.

Figure 10 is a sectional view of a further modification of the elastic element shown in Figure 4. Figure 10a is a central transverse section of the element shown in Figure 10.

Figure 11 is a sectional view of an hydraulic brake wheel cylinder, with parts broken away, showing two opposed compression elements operatively connected to the brake shoes.

Fig. 12 represents a sectional view of a fluid compression cylinder with a compression element with curved leaf springs incorporated in the outer wall.

Figs. 1 to 3b inclusive, represent an example of the invention in which the device is applied to a friction shock absorber of the double oscillating arm type in which the friction pack is provided with a pivot cup $a$. In this cup is fitted an elastic element $b$ composed (see Figures 3 to 3b) of two thick walled concentric cylinders $b$ and $b^1$ which occupy all the space between the cup and the central bolt $e$. The cylinder $b^1$ is fitted into the cylinder $b$ and vulcanized or otherwise sealed at the two ends $c$ and $c$. This compression element might of course, also be formed of one piece cut or separated internally as described.

In order to establish communication between the inner adjacent surfaces of cylinders $b$ and $b^1$, the cylinder $b^1$ is pierced at the centre and the outer edges of the vents or passageways are bevelled to form the depressions $d$ and $d$.

The elastic compression element is transfixed through its axis by the bolt $e$, with a certain amount of friction between the central bore of the elastic element and the bolt, to insure adequate sealing.

The bolt $e$ is bored axially through $e^1$ and transversally through $e^2$, these two bores communicating one with the other and the bore $e^2$ communicating with the two vents $d^1$—$d^1$ of the cylinder $b^1$.

In the head of the bolt $e$ a tooth $e^3$ locks the bolt to the thrust plate $f$ and said thrust plate is locked to one of the arms of the shock absorber by stud $o$.

When fluid is injected (as for example, by a compression pump at the dash, through piping) into the bore $e^1$ of the bolt $e$, it flows through the transverse bore $e^2$ and enters the depressions $d$—$d$ and by compression presses the bevelled edges of the compression element inlet vents or passageways $d^1$—$d^1$ against the rims of the outlet vents or passageways of the bolt and thus seals the compression and tends to prevent the fluid escaping along the bolt. The fluid now tends to enter between the adjacent walls of the concentric elastic cylinders $b$—$b^1$ and to separate them compressing the outer cylinder $b$ against the retaining wall of the pivot cup $a$ and the inner cylinder $b^1$ against the bolt $e$. This radial pressure tends to elongate axially the elastic compression element as a whole which exerts pressure against the washer $g^1$. But inasmuch as the washer $g^1$ is free to slide along the bolt $e$ in the pivot cup $a$, it will be forced axially against the retaining nut $g$ and the bolt $e$ will be pulled up against the thrust plate $f$ which will compress the friction pack against the face plate $h$ which is held against the face of the friction pack by the bevelled edge $a^1$ of the pivot cup $a$. In this manner the frictional resistance between the friction surfaces of the pack can be made to vary at will according to the amount of pressure imparted to the fluid injected into the compression element and the oscillating movements of the shock absorber arms will thereby be made more or less difficult.

The nut $g$ is screwed on to the upper threaded extremity of the bolt $e$. Said nut may be screwed down on the sliding washer $g^1$ and permits of compressing axially the elastic element in the pivot cup $a$ by mechanical means. This mechanical compression by the nut $g$ tends to depress the elastic element in the pivot cup $a$ causing the element to expand radially against the retaining wall of the pivot cup and the bolt and the adjacent surfaces of the concentric cylinders to be pressed one against the other. The mechanical compression on the elastic element therefore, operates in inverse order to the compression imparted hydraulically.

Hydraulic pressure of the elastic element by the injection of fluid in same, may be effected regardless of the degree of mechanical compression to which it is subjected by the nut $g$ and inversely, mechanical compression of the element by nut $g$ may be imparted regardless of the degree of the hydraulic compression. In other words, the hydraulic and the mechanical pressures on the element will supplement each other.

It will be obvious that when hydraulic pressure is applied to the element which is already under mechanical pressure, little or no fluid can penetrate between the adjacent surfaces of the concentric cylinders $b$—$b^1$ and that under these conditions hydraulic pressure may be transmitted through the elastic element by a mere film of fluid between the adjacent surfaces of the concentric cylinders or even, as actual tests have demonstrated, solely by the pressure of the fluid on that portion of the inner surface of cylinder $b$ which may be compressed mechanically into the bevelled depressions $d$—$d$.

In the mass of the elastic element there may be incorporated curved leaf steel springs $i$ disposed longitudinally around the outer wall of the element with the convex surfaces facing inwards towards the centre and with the outer surface of the element suitably curved $b^2$ to follow the concave surface of the springs as indicated in Fig. 4. If this element is substituted for the all-rubber element in the pivot cup $a$ of Fig. 1, the hydraulic pressure exerted radially against the cylinder $b$ will take effect on a series of spring arcs and tend to straighten these and cause them to exert at their extremities an axial thrust (in the sense of the arrow of Fig. 8) against the sliding washer $g^1$ (Fig. 1) and thus augment mechanically the regular hydraulic axial pressure against this part.

Figs. 4, 5, 6 and 7 illustrate a compression element similar to that of Fig. 1 with curved leaf steel springs $i$ incorporated longitudinally in the outer wall of the element but with the extremities abutting in metal flanged washers $k$—$k^1$. When the element so constituted is inserted in the shock absorber pivot cup $a$, as in Fig. 4, the flanged washers $k$—$k^1$ prevent the ends of the springs coming into direct contact with the inner surface of the retaining cup and obviate friction and wear at these points of contact.

The compression element illustrated in Fig. 9 differs from the element in Figs. 4, 5, 6 and 7 just described, in that instead of curved leaf steel springs $i$ being incorporated in the outer wall $b$ of the element, there are incorporated articulated levers $l$ hinged at the centre which, as in the case of the springs illustrated in Figs. 4, 5, 6 and 7 abut with their extremities in the flanged end washers $k$—$k^1$ and function in a similar manner to the curved leaf springs.

The element illustrated in Figures 10 and 10$a$ differs from those illustrated in Figs. 4, 5, 6, 7 9 and 9$a$ inclusive, in that instead of springs and articulated levers, there are incorporated rigid angle levers $m$—$m^1$ with their ends $m^1$ at right angles for example to the arms $m$. The arms $m$ are incorporated longitudinally in the outer wall of the element and the angle section $m^1$ comes flush with the upper surface of the element with the L corners of the levers resting against a metal ring washer $n$. The lateral hydraulic pressure exerted on the outer wall of this element when it is fitted into the pivot cup $a$, will tend to force outwards towards the inner surface of the cup the arms $m$ which, working on the end washer $n$ as a fulcrum, will exert leverage with their angle ends $m^1$ on the sliding washer $g^1$ to force it up against the nut $g$ and exert axial pressure against same.

The composite compression elements of Figs. 4 to 12 inclusive, have preferably a curved outer surface with a profile $b^2$ to facilitate the incorporated mechanical elements being pressed outwards under hydraulic compression.

It will be evident that a friction shock absorber provided with the compression elements of the present specification may function independently under mechanical or hydraulic control. That is, it may be mounted as an ordinary mechanical shock absorber without the hydraulic control and be registered mechanically in the usual manner by means of the nut $g$.

In Figure 11 two elastic compression elements $b$ with curved leaf springs $i$ embodying certain structural modifications, are installed opposed to each other in the wheel cylinder $p$ of a hydraulic brake and have a common base washer $q$ which is free to slide in the cylinder. Two metal tubes $r$—$r^1$ affixed perpendicularly to the centres of the base washer faces, communicate through intercommunicating vents in the washer with the hydraulic brake pressure system. The central portion of the elastic element is hollow to permit of the curved leaf springs being readily depressed mechanically in the container cylinder by the brake shoe return springs $s$ and means is provided to automatically seal compression at the point of entry of the inlet metal tube into the elastic element. The two thrust end washers $t$—$t^1$ of the elements are linked with the two brake shoes. When liquid is injected under pressure into the two compression elements, the hydraulic pressure exerted radially on the elastic walls of same, will tend to straighten out the curved leaf springs which will exert an axial thrust on the brake shoes.

In Figure 12 an element similar to the elements of Figure 11 is inserted in a fluid compression cylinder. The thrust end washer is provided with a sealing ring of rubber or other suitable material which acts as in a plunger, to seal a fluid compressed in advance of the thrust end washer. When fluid is injected under pressure into the element through the inlet pipe, the hydraulic pressure exerted radially against the elastic walls of the element will compress the leaf springs and thus augment mechanically the hydraulic axial pressure on the thrust end washer, and the fluid in advance of it.

From the foregoing specifications it will be evident that the principle of converting hydraulic pressure exerted radially in a given rigid container into axial pressure on the transmitting surface, may be realized with various changes in the arrangement and construction of the compression agent, without departing from the spirit of the invention. Thus, the mechanical parts might be inserted in the rigid cup cylinder or the like independently and separated from the elastic element but working in conjunction with it.

What I claim as new is:

1. In a system for converting fluid pressure into useful work, an element of elastic material having a fluid receiving space therein, a container enclosing said element, piping for injecting fluid under pressure into said element, said element also being adapted to form a fluid seal against the piping, mechanical members associated with the element, said element and mechanical members receiving the pressure of said fluid exerted radially in the body of the element from the center outwards with respect to the longitudinal axis and transforming said radial pressure into axial pressure.

2. In a system for converting fluid pressure into useful work, an element of elastic material having a fluid receiving space therein, mechanical members associated with the element, a container enclosing said element, means for conducting fluid under pressure into said container, said element also being adapted to form a fluid seal against the conducting means, said element and mechanical members receiving pressure which is exerted radially and transforming said radial pressure into axial pressure.

3. In a system for converting fluid pressure into useful work, an element of elastic material having a fluid receiving space therein, a container enclosing said element, a plurality of mechanical members associated with said element, piping for conducting fluid under pressure to said container, said element also being adapted to form a fluid seal against the piping, said mechanical members receiving hydraulic pressure which is exerted radially in the body of the element from the center outwards with respect to the longitudinal axis and transforming said radial pressure into axial pressure.

4. An article of manufacture comprising an elastic body having a bore extending completely therethrough, contiguous walls within said body defining a fluid receiving space, one of said walls having a passageway communicating between said contiguous walls and with a source of pressure.

5. An article of manufacture comprising an elastic body having a bore extending completely therethrough, contiguous walls within said body defining a fluid receiving space, one of said walls having a passageway communicating between said contiguous walls and with a source of pressure, and metallic members associated with said body.

6. An article of manufacture comprising an elastic body having a bore therein, contiguous walls within said body defining a fluid receiving space, one of said walls having a passageway communicating with a source of pressure and articulated levers associated with said body.

7. An article of manufacture comprising an elastic body having a bore therein, contiguous walls within said body defining a fluid receiving space, one of said walls having a passageway communicating with a source of pressure, and leaf spring members associated with said body.

8. An article of manufacture comprising an elastic body having a bore therein, contiguous walls within said body defining a fluid receiving space, one of said walls having a passageway communicating with a source of pressure and metallic members imbedded in said body.

9. An article of manufacture comprising an elastic body having a bore therein, contiguous walls within said body defining a fluid receiving space, one of said walls having a passageway communicating with a source of pressure, and metallic members disposed within said body.

10. An article of manufacture comprising an elastic body having a bore therein, contiguous walls within said body defining a fluid receiving space, one of said walls having a passageway communicating with a source of pressure and articulated levers disposed within said body.

11. An article of manufacture comprising an elastic body having a bore therein, contiguous walls within said body defining a fluid receiving space, one of said walls having a passageway communicating with a source of pressure, and leaf spring members disposed within said body.

12. An article of manufacture comprising an elastic body having a chamber therein, a passageway in communication therewith, and metallic members imbedded in said body.

13. An article of manufacture comprising an elastic body having a chamber therein, a passageway in communication therewith, and metallic members disposed within said body.

14. An article of manufacture comprising an elastic body having a chamber therein, a passageway in communication therewith and articulated levers imbedded in said body.

15. An article of manufacture comprising an elastic body having a chamber therein, a passageway in communication therewith, and leaf spring members imbedded in said body.

16. An article of manufacture comprising an elastic body having an external surface, a bore extending completely through said body, internal contiguous walls therein defining a fluid receiving space, a passageway extending through one of said walls communicating between said contiguous walls and mechanical members disposed about said surface.

17. An article of manufacture comprising an elastic body having an external surface, a bore within said body, internal contiguous walls therein defining a fluid receiving space, a passageway extending through one of said walls, and articulated levers disposed about said external surface.

18. An article of manufacture comprising an elastic body having an external surface, a bore within said body, internal contiguous walls therein defining a fluid receiving space, a passageway extending through one of said walls and leaf spring members disposed about said surface.

19. An article of manufacture comprising an elastic body having an external surface and a chamber within the body, a passageway in communication therewith, and mechanical members disposed about said external surface parallel to the longitudinal axis of said body, said elastic body and mechanical elements adapted to be distended radially and axially when subjected to pressure in a hydraulic system.

20. An article of manufacture comprising an elastic body having an external surface and a chamber within the body, a passageway in communication therewith, and articulated levers disposed about said external surface.

21. An article of manufacture comprising an elastic body having an external surface and a chamber within the body, a passageway in communication therewith, and leaf spring members disposed about said external surface.

22. In a system for converting fluid pressure into useful work, an element of elastic material with inner walls disposed longitudinally in the element substantially perpendicular to the plane of power transmission and contiguous to each other, the whole enclosed in a container, piping communicating with one of said walls for conducting fluid under pressure between the walls in said element, one of the walls in the body of the element forming a fluid seal against the piping, the force exerted by said fluid under pressure being adapted to compress said element into a resisting medium in the said container.

23. An article of manufacture comprising an elastic body having a fluid receiving space therein, a passageway in said body adapted to connect said fluid receiving space with a source of fluid under pressure, said body adapted to be subjected to the force exerted radially by said fluid under pressure with respect to the longitudinal axis of the body and cause said elastic body to expand axially, and thereby transform said radial pressure in axial pressure to be utilized in a hydraulic system.

24. An article of manufacture comprising an elastic body having a longitudinal bore completely therethrough, a mechanical member disposed within said body, a container for said body, a passageway in said container and means connecting the elastic body with a source of pressure.

PHILIP SIDNEY BALDWIN.